(12) United States Patent
Ikeda et al.

(10) Patent No.: US 9,322,376 B2
(45) Date of Patent: Apr. 26, 2016

(54) CONTROL DEVICE FOR INTERNAL COMBUSTION ENGINE

(75) Inventors: Yuji Ikeda, Kobe (JP); Naoki Toda, Nishio (JP); Shigeo Nomura, Kariya (JP)

(73) Assignee: IMAGINEERING, INC., Hyogo (JP)

( * ) Notice: Subject to any disclaimer, the term of this patent is extended or adjusted under 35 U.S.C. 154(b) by 293 days.

(21) Appl. No.: 14/129,434

(22) PCT Filed: Jun. 29, 2012

(86) PCT No.: PCT/JP2012/066710
§ 371 (c)(1),
(2), (4) Date: Mar. 13, 2014

(87) PCT Pub. No.: WO2013/002375
PCT Pub. Date: Jan. 3, 2013

(65) Prior Publication Data
US 2014/0190452 A1    Jul. 10, 2014

(30) Foreign Application Priority Data

Jun. 30, 2011    (JP) .................................. 2011-145676

(51) Int. Cl.
*F02M 69/46*    (2006.01)
*F02D 41/14*    (2006.01)
(Continued)

(52) U.S. Cl.
CPC .............. *F02M 69/46* (2013.01); *F02B 23/101* (2013.01); *F02D 41/1497* (2013.01); *F02D 41/403* (2013.01); *F02M 45/04* (2013.01); *F02M 61/1813* (2013.01); *F02P 5/045* (2013.01);
(Continued)

(58) Field of Classification Search
CPC ... F02M 69/46; F02M 45/04; F02M 61/1813; F02M 25/0715; F02D 41/1497; F02D 41/402; F02D 41/403; F02D 2200/101; Y02T 10/125; Y02T 10/44
See application file for complete search history.

(56) References Cited

U.S. PATENT DOCUMENTS 6,688,279 B2 * 2/2004 Ishikawa ............. F02D 41/0057
123/299
2010/0180871 A1 7/2010 Ikeda et al.
(Continued)

FOREIGN PATENT DOCUMENTS

EP    2180172 A1    4/2010
EP    2180177 A1    4/2010
(Continued)

OTHER PUBLICATIONS

International Search Report for PCT/JP2012/066710, Mailing Date of Nov. 20, 2012.

*Primary Examiner* — Hieu T Vo
(74) *Attorney, Agent, or Firm* — Westerman, Hattori, Daniels & Adrian, LLP

(57) ABSTRACT

An internal combustion engine has an ignition promotion unit that has a function of promoting ignition of fuel sprays formed by the small quantity injections by supplying the fuel sprays with electric energy. The engine is provided with a control device which has a combustion control unit that carries out processing of causing the fuel injection valve to perform the plurality of times of small quantity injections so that fuel sprays formed by the first-time small quantity injection from among the plurality of times of small quantity injections are connected with one another by the fuel sprays formed by the subsequent small quantity injections from among the plurality of times of small quantity injections.

11 Claims, 7 Drawing Sheets

(51) Int. Cl.
- *F02D 41/40* (2006.01)
- *F02B 23/10* (2006.01)
- *F02P 5/04* (2006.01)
- *F02M 61/18* (2006.01)
- *F02M 45/04* (2006.01)
- *F02B 31/08* (2006.01)
- *F02M 25/07* (2006.01)
- *F02P 3/04* (2006.01)
- *F02P 23/04* (2006.01)

(52) U.S. Cl.
CPC ......... *F02B31/085* (2013.01); *F02B 2023/103* (2013.01); *F02B 2023/108* (2013.01); *F02D 41/402* (2013.01); *F02D 2200/101* (2013.01); *F02M 25/0715* (2013.01); *F02P 3/04* (2013.01); *F02P 23/045* (2013.01); *Y02T 10/125* (2013.01); *Y02T 10/44* (2013.01)

(56) References Cited

U.S. PATENT DOCUMENTS

| | | |
|---|---|---|
| 2010/0192909 A1 | 8/2010 | Ikeda |
| 2011/0025210 A1 | 2/2011 | Ikeda |

FOREIGN PATENT DOCUMENTS

| | | |
|---|---|---|
| EP | 2264308 A1 | 12/2010 |
| EP | 2330283 A1 | 6/2011 |
| JP | 2005-240645 A | 9/2005 |
| JP | 2009-36200 A | 2/2009 |
| JP | 2009-287549 A | 12/2009 |
| JP | 2009-299496 A | 12/2009 |
| JP | 2010-37948 A | 2/2010 |
| JP | 2010-216270 A | 9/2010 |
| WO | 2009/008521 A1 | 1/2009 |
| WO | 2009/113693 A1 | 9/2009 |
| WO | 2010/035341 A1 | 4/2010 |

* cited by examiner (a)

(b)

(A) Plasma generation at last small quantity split injection (B) Plasma generation at second small quantity split injection (C) Plasma generation at first small quantity split injection

CONTROL DEVICE FOR INTERNAL COMBUSTION ENGINE

TECHNICAL FIELD

The present invention relates to a control device for an internal combustion engine that causes a fuel injection valve formed with a plurality of injection holes to perform a main injection and a plurality of small quantity injections preceding the main injection for one cylinder of a compression ignition type internal combustion engine during one combustion cycle of the internal combustion engine.

BACKGROUND ART

As a control device of this kind, there is known a control device that causes a fuel injection valve to perform multiple injections consisting of a main injection and a plurality of pilot injections preceding the main injection, as disclosed in, for example, Japanese Unexamined Patent Application, Publication No. 2009-299496. More particularly, the pilot injections are performed by injecting and combusting a very small quantity of fuel so as to increase in-cylinder temperature of an internal combustion engine prior to the main injection for the purpose of reducing a delay of ignition timing after the main injection and thus reducing NOx (nitrogen oxide) emissions while suppressing noise (combustion noise) produced as a result of the combustion. On the other hand, the main injection contributes to torque production of the internal combustion engine and has the largest injection amount among the multiple injections.

Meanwhile, with the aim to further improve the combustion condition of an internal combustion engine, there is also provided a technology for emitting an electromagnetic wave to a combustion chamber of the internal combustion engine, as disclosed in Japanese Unexamined Patent Application, Publication No. 2009-287549. More particularly, an antenna is arranged in the combustion chamber, and by means of the antenna, the electromagnetic wave is emitted, thereby generating plasma in the combustion chamber. Since OH radicals and the like are generated in the combustion chamber when the plasma is generated, the OH radicals and the like thus generated come to bind to fuel sprays. Accordingly, it is possible to promote ignition of the fuel sprays, and thus, it is possible to improve combustion condition of the internal combustion engine.

THE DISCLOSURE OF THE INVENTION

Problems to be Solved by the Invention

There may be a case in which the fuel spray formed by the pilot injection is not properly combusted. For example, some of the fuel sprays out of a plurality of the fuel sprays that are formed by the pilot injections from a plurality of injection holes of a fuel injection valve are unburned. This comes from a failure of promoting ignition of the plurality of the fuel sprays separated from one another properly since the plasma is generated only locally in the combustion chamber. When the fuel sprays are not properly combusted due to the reason described above, each fuel sprays formed by the subsequent main injection may not be properly combusted, thereby degrading the combustion condition of the internal combustion engine. In this case, there is a concern that the combustion noise may increase.

The present invention has been made in view of the above described problems, and it is an object of the present invention to provide a control device for an internal combustion engine that can appropriately suppress degradation of combustion condition of the internal combustion engine.

Means for Solving the Problems

In the following, a description will be given of a method for solving the above described problems and effects thereof.

In accordance with a first aspect of the present invention, there is provided a control device for an internal combustion engine that causes a fuel injection valve formed with a plurality of injection holes to perform a main injection and a plurality of times of small quantity injections preceding the main injection for one cylinder of a compression ignition type internal combustion engine during one combustion cycle of the internal combustion engine, the internal combustion engine including an ignition promotion unit that has a function of promoting ignition of fuel sprays formed by the small quantity injections by supplying the fuel sprays with electric energy, and the control device including a combustion control unit that carries out processing of causing the fuel injection valve to perform the plurality of times of small quantity injections so that fuel sprays formed by the first-time small quantity injection from among the plurality of times of small quantity injections are connected with one another by the fuel sprays formed by the subsequent small quantity injections from among the plurality of times of small quantity injections.

The compression ignition type internal combustion engine generally has a function of creating a swirl in the combustion chamber while introducing intake air into the combustion chamber during an intake stroke for a purpose of suppressing degradation in combustion condition. In this case, the fuel sprays formed by the small quantity injections from the injection holes follow the swirl and move in the combustion chamber.

In view of this point, according to the aforementioned invention, the processing of causing the fuel injection valve to perform the plurality of times of small quantity injections so that fuel sprays formed by the first-time small quantity injection from among the plurality of times of small quantity injections are connected with one another by the fuel sprays sequentially formed by the subsequent small quantity injections from among the plurality of times of small quantity injections with the aid of the swirl. According to the processing described above, it is possible to connect the plurality of fuel sprays respectively formed by the plurality of times of small quantity injections into one continuous fuel spray. This means that it is possible to fill gaps between pairs of adjacent fuel sprays from among the fuel sprays formed by the first-time small quantity injection with the fuel sprays formed by the subsequent small quantity injections by connecting the fuel sprays formed by the small quantity injections consecutive in time for each injection hole. Accordingly, once ignition is promoted by the ignition promotion unit at any part of the fuel spray present in the combustion chamber, the combustion can be propagated to the continuous fuel spray as a whole. Accordingly, it is possible to promote combustion of the fuel sprays formed by the plurality of times of small quantity injections, thereby appropriately suppressing degradation in combustion condition of the internal combustion engine.

In accordance with a second aspect of the present invention, in addition to the first aspect of the present invention, the combustion control unit carries out processing of setting the number of times of the small quantity injections and a time interval between the small quantity injections based on at least one of a gas density in the combustion chamber of the internal combustion engine, a fuel injection pressure of the fuel injection valve, a fuel injection quantity allocated to the small quantity injection, and a rotation speed of a swirl created in the combustion chamber.

In accordance with the gas density in the combustion chamber, the fuel injection pressure of the fuel injection valve, the fuel injection quantity, and the swirl rotation speed, it is possible to sense a shape of the fuel spray formed by the small quantity injection. In view of this point, according to the aforementioned invention, the number of times of small quantity injections and the time interval between the small quantity injections are set in the manner described above. Accordingly, it is possible to properly control the fuel injection so that fuel sprays formed by the first-time small quantity injection from among the plurality of times of small quantity injections are connected with one another by the fuel sprays formed by the subsequent small quantity injections from among the plurality of times of small quantity injections.

In accordance with a third aspect of the present invention, in addition to the first or the second aspect of the present invention, the combustion control unit carries out processing of adjusting a rotation speed of a swirl created in the combustion chamber of the internal combustion engine so that fuel sprays formed by the first-time small quantity injection from among the plurality of times of small quantity injections are connected with one another by the fuel sprays formed by the subsequent small quantity injections from among the plurality of times of small quantity injections.

According to the aforementioned invention, it is possible to achieve a proper swirl rotation speed for the purpose of connecting the plurality of the fuel sprays respectively formed by the plurality of times of small quantity injections into one continuous fuel spray.

In accordance with a fourth aspect of the present invention, there is provided a control device for an internal combustion engine that causes a fuel injection valve formed with a plurality of injection holes to perform a main injection and a plurality of times of small quantity injections preceding the main injection for one cylinder of a compression ignition type internal combustion engine during one combustion cycle of the internal combustion engine, the internal combustion engine including an ignition promotion unit that has a function of promoting ignition of fuel sprays formed by the small quantity injections by supplying the fuel sprays with electric energy, and control device including a combustion control unit that carries out processing of adjusting a rotation speed of a swirl created in a combustion chamber of the internal combustion engine so that fuel sprays formed by the first-time small quantity injection from among the plurality of times of small quantity injections are connected with one another by the fuel sprays formed by the subsequent small quantity injections from among the plurality of times of small quantity injections.

According to the aforementioned invention, for a purpose of suppressing degradation of the combustion condition, the rotation speed of the swirl created in the combustion chamber is adjustable while intake air is introduced in the combustion chamber during an intake stroke. The fuel sprays formed by the small quantity injections from the injection holes follow the swirl and move in the combustion chamber. The moving speed of the fuel sprays following the swirl in the combustion chamber changes depending on the swirl rotation speed.

In view of this point, according to the aforementioned invention, the swirl rotation speed is adjusted so that the fuel sprays formed by the small quantity injections consecutive in time are connected with one another for each injection hole, thereby connecting the plurality of fuel sprays respectively formed by the plurality of times of small quantity injections into one continuous fuel spray. This means that a gap between each pair of adjacent fuel sprays from among the fuel sprays formed by the first-time small quantity injection is filled with the fuel sprays formed by the subsequent small quantity injections. As a result of this, once ignition is promoted by the ignition promotion unit at any part of the fuel spray present in the combustion chamber, the combustion can be propagated to the continuous fuel spray as a whole. Accordingly, it is possible to promote combustion of the fuel sprays formed by the plurality of times of small quantity injections, thereby appropriately suppressing degradation in combustion condition of the internal combustion engine.

In accordance with a fifth aspect of the present invention, in addition to any one of the first to fourth aspects of the present invention, the ignition promotion unit is constituted by a plasma generation unit that generates plasma in the combustion chamber of the internal combustion engine.

In accordance with a sixth aspect of the present invention, in addition to the fifth aspect of the present invention, the plasma generation unit includes electrodes protruding toward the combustion chamber and is adapted to generate plasma in the combustion chamber by way of a discharge between the electrodes.

In accordance with a seventh aspect of the present invention, in addition to the fifth or the sixth aspect of the present invention, the plasma generation unit generates plasma in the combustion chamber by emitting an electromagnetic wave toward the combustion chamber.

In accordance with an eighth aspect of the present invention, in addition to any one of the first to seventh aspects of the present invention, the control device further including a unit for supplying the fuel sprays with electric energy by means of the ignition promotion unit during a period starting from the time of the first-time small quantity injection from among the plurality of times of small quantity injections until the time of the main injection.

According to the aforementioned invention, it is possible to supply the fuel sprays formed by the small quantity injections with electric energy by means of the ignition promotion unit at an appropriate timing for promoting ignition of the fuel sprays.

In accordance with a ninth aspect of the present invention, in addition to any one of the first to eighth aspects of the present invention, the plurality of the injection holes are formed on a plane perpendicular to a central axis of the fuel injection valve and spaced apart from one another at intervals on a periphery of the fuel injection valve.

In accordance with a tenth aspect of the present invention, in addition to the fifth, sixth, or seventh aspect of the present invention, the plasma generation unit is caused to generate plasma prior to the plurality of times of small quantity injections so that active species comes into a diffusion state owing to a swirl created in the combustion chamber at a start time of the plurality of times of small quantity injections.

According to the aforementioned invention, even if some regions may exist in which the fuel concentration is lean in the combustion chamber, it is possible to propagate the combustion from a region (a burned region) in which combustion has already started.

In accordance with an eleventh aspect of the present invention, in addition to the fifth, sixth, or seventh aspect of the present invention, the plasma generation unit is caused to generate plasma a plurality of times during a period while the fuel sprays of the plurality of times of small quantity injections are present.

According to the eleventh aspect of the present invention, it is possible to ensure the combustion of the fuel sprays formed by the plurality of times of small quantity injections.

BEST MODE FOR CARRYING OUT THE INVENTION

In the following, a description will be given of an embodiment of a control device according to the present invention applied to an on-vehicle accumulator fuel injection system with reference to drawings.

Figure 1:
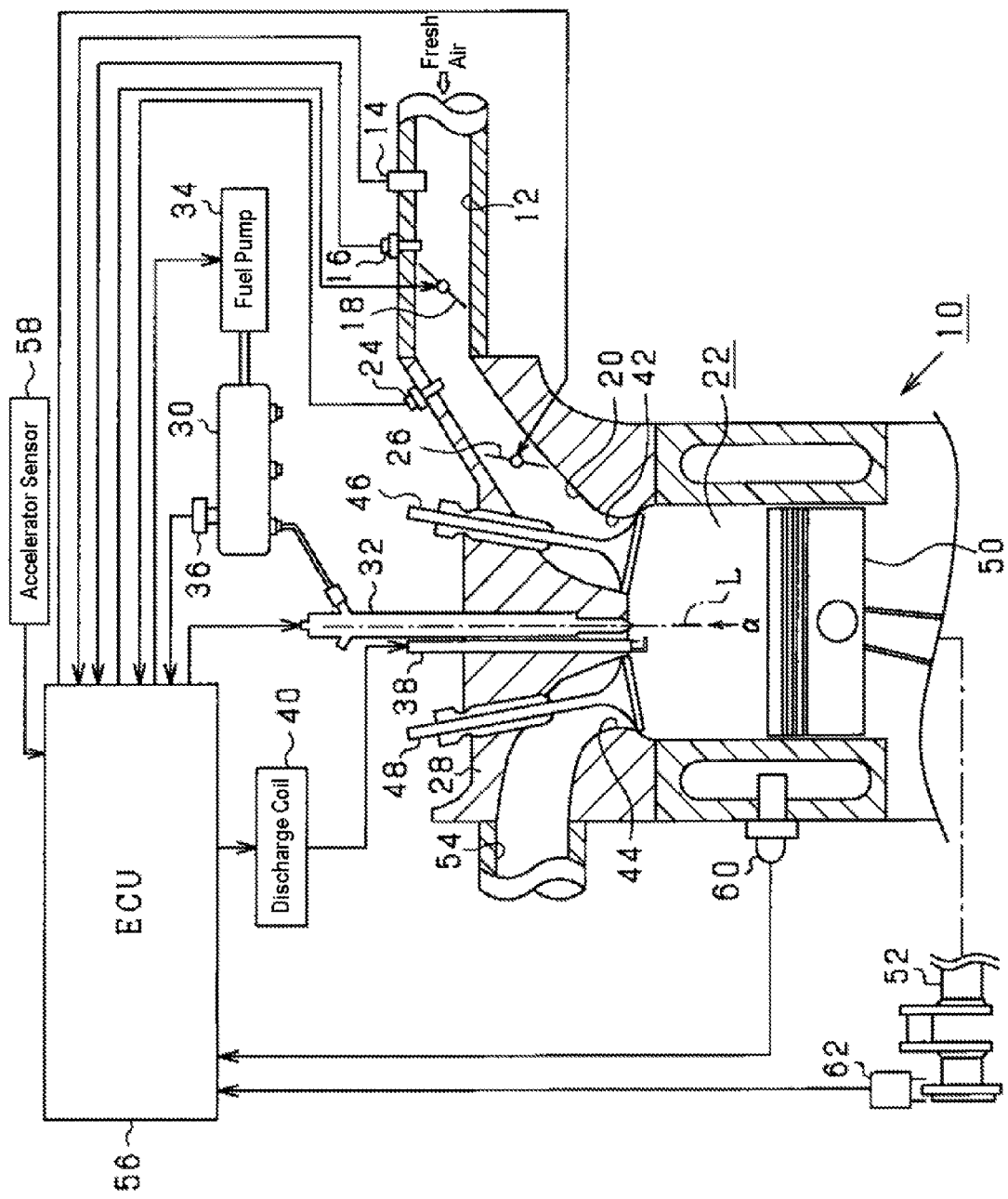
FIG. 1 is a system configuration diagram according to an embodiment.

FIG. 1 shows a system configuration according to the embodiment.

An engine 10 shown in FIG. 1 is a compression ignition type internal combustion engine (a diesel engine). More particularly, the engine 10 is a four stroke multi-cylinder engine having intake, compression, expansion, and exhaust strokes in a single combustion cycle (720 degree crank angle).

An intake passage 12 of the engine 10 is provided with, sequentially from an upstream side, an airflow meter 14 that detects a quantity (a fresh air quantity) of intake air, an intake temperature sensor 16 that detects a temperature of the intake air, and an electronically controlled intake throttle valve 18 that is operated by an actuator such as a DC (direct current) motor to adjust a throttle position.

A downstream side from the intake throttle valve 18 of the intake passage 12 is connected via an intake manifold 20 to a combustion chamber 22 of each cylinder of the engine 10. The intake manifold 20 is provided with an intake pressure sensor 24 that detects a pressure of intake air flowing through the passage, and an airflow control valve 26 that creates an airflow in the combustion chamber 22. More particularly, the airflow control valve 26 is an electronically-controlled valving element that can adjust the rotation speed of a swirl created while the intake air is introduced in the combustion chamber 22 during the intake stroke.

A cylinder head 28 of the engine 10 is provided, for each cylinder, with an electronically controlled fuel injection valve 32 that directly injects and supplies fuel supplied from a common rail 30 to the combustion chamber 22. More particularly, the fuel injection valve 32 is formed with a plurality of injection holes, and the fuel is injected from the injection holes. Here, the common rail 30 is an accumulator that accumulates the fuel that has been pressure-fed from a fuel pump 34, in a high pressure state. The fuel pump 34 is provided with an electronically controlled valving element (not shown). The valving element is electrically operated to adjust a pressure-feed quantity to the common rail 30 so that the fuel pump 34 can adjust a rail pressure (a fuel injection pressure of the fuel injection valve 32), which is a fuel pressure in the common rail 30. Also, the common rail 30 is provided with a fuel pressure sensor 36 that detects the rail pressure.

The cylinder head 28 is provided with a discharger 38 for each cylinder. More particularly, the discharger 38 is configured to include, at a tip end thereof, a pair of electrodes respectively having tip ends arranged to protrude toward the combustion chamber 22.

The discharger 38 is electrically connected to a discharge coil 40 for causing a discharge between the electrodes of the discharger 38. The discharge coil 40 is adapted to cause the discharge at a gap between the electrodes by applying a high voltage between the electrodes using a vehicle battery (not shown) as a power supply. As the discharge coil 40, for example, a configuration (an ignition coil) shown in FIG. 1 of Japanese Unexamined Application, Publication No. 2009-41506 may be employed.

Each cylinder of the engine 10 is provided with a plurality (two) of intake ports 42 and exhaust ports 44. Each of the intake ports 42 and exhaust ports 44 is opened and closed respectively by an intake valve 46 and an exhaust valve 48. A mixture of the intake air introduced to the combustion chamber 22 by opening the intake valve 46 and the fuel injected and supplied from the fuel injection valve 32 is compressed in the combustion chamber 22 and ignited for combustion. Energy produced by the combustion is extracted via a piston 50 as rotation energy of an output shaft (a crankshaft 52) of the engine 10. The combusted fuel air mixture is exhausted to an exhaust passage 54 as an exhaust gas by opening the exhaust valve 48.

In the combustion chamber 22, apart of the exhaust gas exhausted from the combustion chamber 22 is recirculated to the intake passage 12 as EGR (Exhaust Gas Recirculation) via an EGR passage (not shown) that connects between the exhaust passage 54 and the intake passage 12. Quantity of the EGR is adjusted by an electronically controlled valving element (not shown) that adjusts a flow passage area of the EGR passage. According to the present embodiment, hereinafter, the fresh air and the EGR are inclusively referred to as the "intake air".

Then, a description will be given of an arrangement of the fuel injection valve 32 and the discharger 38 according to the present embodiment with reference to FIG. 2. More particularly, FIG. 2 is a drawing of the fuel injection valve 32 shown in FIG. 1 viewed from a direction (a plane perpendicular to a central axis L of the fuel injection valve 32 viewed from a side of a tip end of the fuel injection valve 32).

Figure 2:
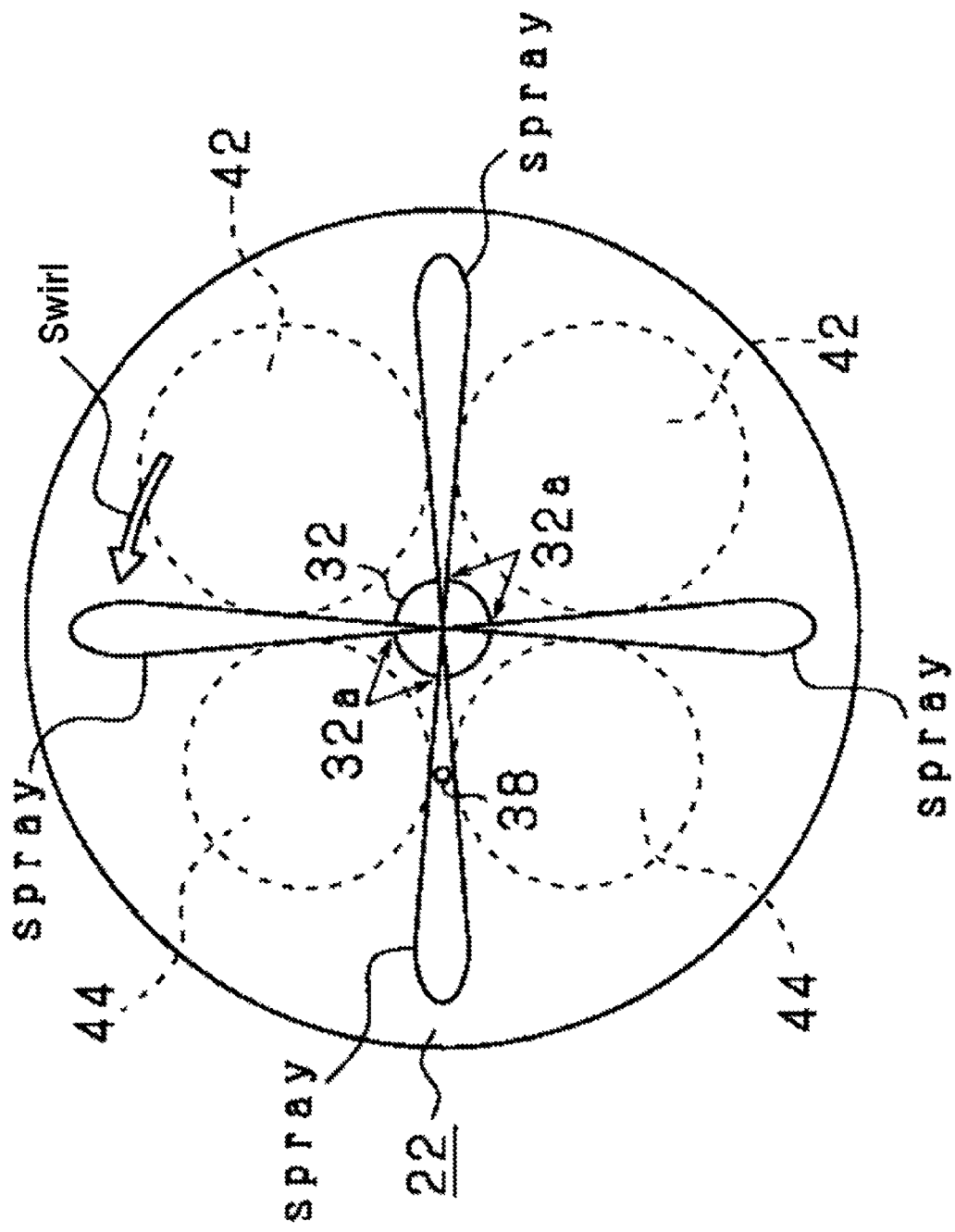
FIG. 2 is a drawing showing an arrangement of a fuel injection valve and a discharger according to the embodiment.

As shown in FIG. 2, the fuel injection valve 32 is formed with a plurality of injection holes 32a (four injection holes are exemplified in FIG. 2) spaced apart at intervals on a periphery thereof. More particularly, the plurality of injection holes 32a are approximately equidistantly formed on the periphery of the fuel injection valve 32 on the plane perpendicular to the central axis of the fuel injection valve 32. As a result of this, trajectories of the fuel sprays designated by the characters "spray" respectively injected from the injection holes 32a extend approximately equidistantly in radial fashions in relation to the periphery of the fuel injection valve 32. The fuel injection valve 32 and the discharger 38 are arranged so that one of the fuel sprays "spray" passes through in the vicinity of the electrodes of the discharger 38.

Each fuel spray which has extended in the radial fashion follows the swirl created in the combustion chamber 22 and then moves while changing its shape. More particularly, in the combustion chamber 22, as the fuel spray moves away from the central axis of the fuel injection valve 32 outwardly with respect to a direction perpendicular to the central axis, a distance which the fuel spray moves and extends along a direction of the swirl tends to increase. This results from the fact that droplets in the vicinity of a tip end of the fuel spray are exposed to the swirl from a time of injection until the droplets approach to the tip end. This means that a time period for which those droplets are exposed to the swirl is longer than the others, and therefore, a distance which those droplets travel along the direction of the swirl is increased.

Returning back to FIG. 1, an ECU (Electronic Control Unit) 56 is a control device that operates various actuators required for various controls of an accumulator type fuel injection system. The ECU 56 sequentially inputs detection signals and the like from an accelerator sensor 58 that detects a driver's operation amount of the accelerator, a water temperature sensor 60 that detects a temperature (a cooling water temperature) of cooling water for cooling the engine 10, a crank angle sensor 62 that detects a rotation angle position of the crankshaft 52, the airflow meter 14, the intake temperature sensor 16, the intake pressure sensor 24, and the fuel pressure sensor 36. Based on the above described input signals, the ECU 56 carries out combustion control processing of the engine 10 such as fuel pressure control processing of electrically operating the fuel pump 34 to control the rail pressure to a target pressure, fuel injection control processing by means of the fuel injection valve 32, swirl control processing by means of an airflow control valve 26, and plasma generation processing by means of the discharge coil 40.

The fuel injection control processing will be described hereinafter. According to the present embodiment, the fuel injection control processing is processing of electrically controlling the fuel injection valve 32 to perform multiple injections, in which the fuel injection valve 32 injects and supplies the fuel to one cylinder a plurality of times during one combustion cycle (720 degree crank angle). More particularly, a main injection and a pilot injection are performed as the multiple injections. Here, the main injection is performed after the pilot injection and immediately before or in the vicinity of the compression top dead center. The main injection contributes to torque production of the engine 10 and is the largest in injection quantity among the multiple injections.

On the other hand, the pilot injection is designed to inject and combust a very small quantity of fuel in (a latter half of) the compression stroke prior to the main injection so as to increase an engine in-cylinder temperature (a temperature in the combustion chamber 22) before the main injection, thereby reducing a delay of ignition timing after the main injection. More particularly, when the fuel spray formed by the pilot injection is combusted, the temperature of the combustion chamber 22 rises. The rise in temperature of the combustion chamber 22 makes earlier an ignition timing (shortens an ignition delay time) of the fuel spray formed by the subsequent main injection, and reduces an evaporation amount of the fuel supplied to the combustion chamber 22 by the main injection. As a result of this, it is possible to slow down a combustion (a pre-mixture combustion) of the mixture of intake air and the fuel spray formed by the main injection, thereby suppressing the increase of noise (combustion noise) caused by the combustion due to the decrease of pressure rise rate in the combustion chamber 22, as well as emissions of nitrogen oxides (NOx).

Furthermore, during the fuel injection control processing, in accordance with the accelerator operation amount based on an output value of the accelerator sensor 58 and an engine rotation speed based on an output value of the crank angle sensor 62, a fuel injection quantity (a required injection quantity) from the fuel injection valve 32 required for one combustion cycle to produce an engine required torque is calculated. Then, the required injection quantity is divided into injection quantities of the pilot injection and the main injection, and each injection quantity thus divided is set to an instruction value (an instruction injection quantity) of fuel injection quantity for the fuel injection valve 32. A time interval between an end timing of the pilot injection and a start timing of the main injection is calculated from the required injection quantity, the engine rotation speed, the cooling water temperature based on an output value of the water temperature sensor 60, and the like. In accordance with the rail pressure based on an output value of the fuel pressure sensor 36, the instruction injection quantity, the time interval described above, and the like, instruction injection timings are calculated for the fuel injection valve 32 to perform the multiple injections. Subsequently, a quantity of fuel based on the required injection quantity is injected from the injection holes 32*a* by electrically operating the fuel injection valve 32 in accordance with each of instruction injection timings.

The swirl control processing is processing of electrically operating the airflow control valve 26 to control a swirl rotation speed to be an appropriate speed according to an operation condition of the engine 10. Here, the swirl rotation speed according to the operation condition of the engine 10 has been predetermined through experiments and the like in view of improvement in operation condition of the engine 10. The swirl rotation speed may be estimated based on, for example, an operation state of the airflow control valve 26 and an intake pressure detected by the intake pressure sensor 24.

The plasma generation processing is processing for a purpose of promoting automatic ignition of the fuel sprays and improving the combustion condition. More particularly, when a discharge is caused at the gap between the electrodes of the discharger 38, since a gas between the electrodes is brought into a plasma state, OH radicals and the like are generated in the vicinity of the electrodes. The generated OH radicals and the like are bound to the fuel sprays, thereby promoting ignition of the fuel sprays.

There may be a case in which the fuel spray formed by the pilot injection may not be properly combusted such as a case in which the four fuel sprays formed by the pilot injections and spaced apart from one another in the combustion chamber 22 are only partially burned. One reason for this case is the fact that the plasma is only locally generated by the discharger 38.

Also, a low compression ratio of the engine 10 for a purpose of reduction of the combustion noise and the like, and the increase in EGR supplied to the combustion chamber 22 can be regarded as another reasons for the above-described case since the combustion chamber 22 tends to decrease in temperature owing to the low compression ratio or the high EGR rate.

As a method for properly combusting the fuel spray formed by the pilot injection, there may be conceived a method of increasing a distance between electrodes of the discharger 38 or of providing a plurality of the dischargers 38 in accordance with the number and locations of the injection holes 32*a*, for example. However, there is a concern that the increase in distance between the electrodes and the increase in number of the dischargers 38 would increase electric energy and the cost for plasma generation.

In order to solve the problems described above, according to the present embodiment, pilot split injection processing is carried out such that the pilot injection is further split equally into a plurality of times of small quantity injections (small quantity split injections), and the fuel injection valve 32 is caused to perform the plurality of times of small quantity split injections so that fuel sprays formed by a first-time small quantity split injection are connected with one another by fuel sprays formed by the subsequent small quantity split injections from among the plurality of times of small quantity split injections with the aid of the swirl.

Figure 3:
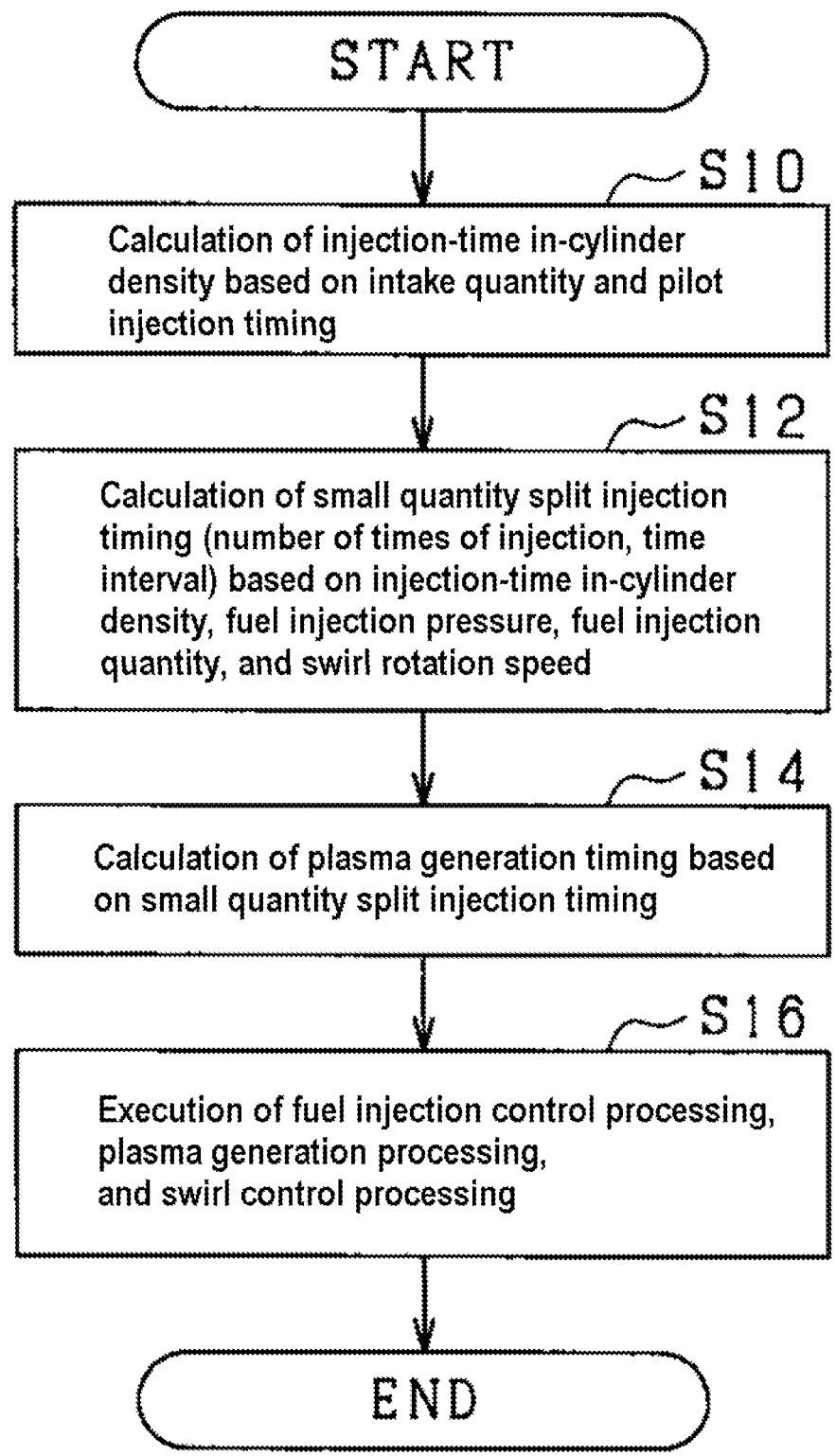
FIG. 3 is a flowchart showing a procedure of pilot split injection processing according to the embodiment.

FIG. 3 shows a procedure of the pilot split injection processing according to the present embodiment. The processing is repeatedly carried out by the ECU 56 at a predetermined cycle, for example.

Firstly during the series of processes, in Step S10, a density (a gas density in the cylinder at the time of the pilot injection: hereinafter, referred to as an "injection-time in-cylinder density") in the combustion chamber 22 at the time of the pilot injection is calculated based on the intake quantity supplied to the combustion chamber 22 and a pilot injection timing. The injection-time in-cylinder density tends to grow as the intake quantity filled in the combustion chamber 22 is incremented. Here, the pilot injection timing is a timing corresponding to the pilot injection from among the instruction injection timings calculated in the fuel injection control processing.

More particularly, the injection-time in-cylinder density may be calculated using a map that defines values of the injection-time in-cylinder density associated with the pilot injection timing, for example. The injection-time in-cylinder density can be associated with the pilot injection timing because the rotation angle position of the crankshaft 52 can be associated with the density in the combustion chamber 22 that grows in association with a rise of the piston 50, and the rotation angle position of the crankshaft 52 can be associated with the pilot injection timing. Furthermore, the intake quantity may be calculated based on, for example, the fresh air quantity detected by the airflow meter 14 and the EGR quantity supplied to the combustion chamber 22. More particularly, the intake quantity may be a value calculated by adding the fresh air quantity and the EGR quantity.

In Step S12, based on parameters (A) to (D), which will be described later, a number (the number of times of the small quantity split injections) of splits of the pilot injection and a time interval (a small quantity split injection interval) between an end timing of one small quantity split injection and a start timing of the next small quantity split injection are calculated so that fuel sprays formed by the first-time small quantity split injection from among the plurality of times of small quantity split injections are connected with each other by the fuel sprays formed by the subsequent small quantity split injections from among the plurality of times of small quantity split injections.

(A) Injection-Time In-Cylinder Density

Figure 4:
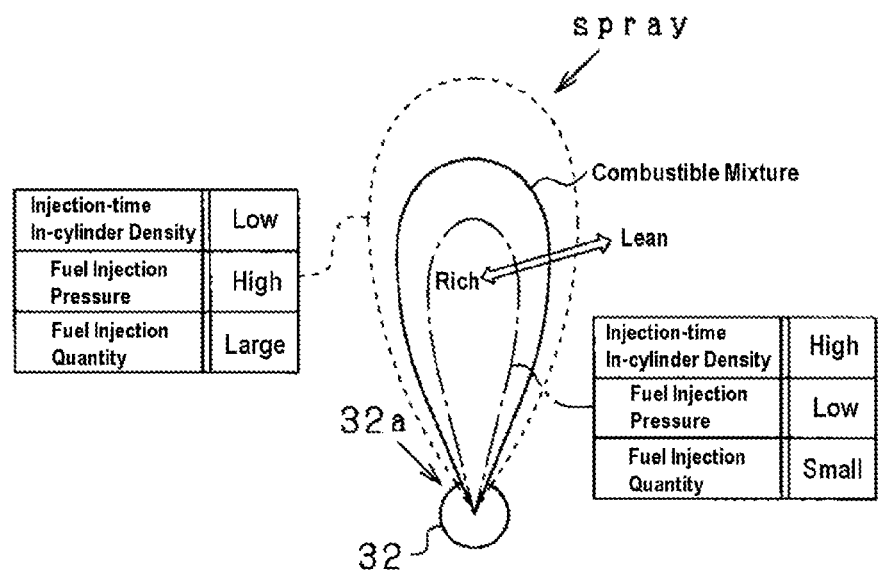
FIG. 4 is a drawing showing a formation of the fuel sprays according to the embodiment.
Figure 4:
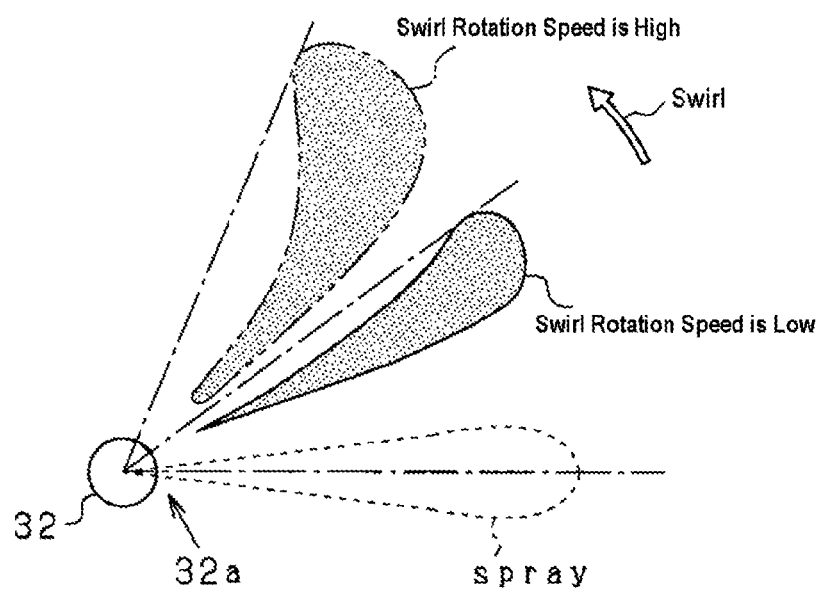

As shown in FIG. 4a, as the injection-time in-cylinder density grows, since the fuel spray "spray" is prevented from spreading, the fuel spray "spray" tends to be reduced in breadth. Therefore, as the injection-time in-cylinder density grows, an interval in distance between fuel sprays formed by the small quantity injections respectively corresponding to a pair of adjacent injection holes 32a tends to increase. In view of the tendency described above, in order to connect the plurality of fuel sprays formed by the plurality of small quantity split injections into one continuous fuel spray, as the injection-time in-cylinder density grows, the number of splits of the pilot injection may be increased and the small quantity split injection interval may be decreased, for example. In this manner, it is possible to perform the subsequent small quantity split injections so as to fill gaps between the adjacent fuel sprays formed by the first-time small quantity split injection from among the plurality of times of small quantity split injections.

(B) Fuel Injection Pressure of the Fuel Injection Valve 32

As shown in FIG. 4a, as the fuel injection pressure of the fuel injection valve 32 grows, the fuel spray "spray" tends to be increased in breadth. Therefore, as the fuel injection pressure grows, an interval in distance between fuel sprays formed by the small quantity injections respectively corresponding to a pair of adjacent injection holes 32a tends to decrease. In view of the tendency described above, in order to connect the plurality of fuel sprays into one continuous fuel spray, as the fuel injection pressure decreases, the number of splits of the pilot injection may be increased and the small quantity split injection interval may be decreased, for example. The fuel injection pressure of the fuel injection valve 32 may be calculated based on an output value of the fuel pressure sensor 36.

(C) Fuel Injection Quantity Allocated to the Pilot Injection from Among the Required Injection Quantity (Hereinafter, Simply Referred to as "Fuel Injection Quantity")

As shown in FIG. 4a, as the fuel injection quantity grows, the fuel spray tends to be increased in breadth. Therefore, as the fuel injection quantity grows, an interval in distance between fuel sprays formed by the small quantity injections respectively corresponding to a pair of adjacent injection holes 32a tends to decrease. In view of the tendency described above, in order to connect the plurality of fuel sprays into one continuous fuel spray, as the fuel injection quantity decreases, the number of splits of the pilot injection may be increased and the small quantity split injection interval may be reduced, for example.

(D) Swirl Rotation Speed:

As shown in FIG. 4b, as the swirl rotation speed grows, the fuel spray "spray" formed by the injection from the injection hole 32a tends to be increased in displacement per unit time. In view of the tendency described above, in order to connect the plurality of fuel sprays sequentially formed by the plurality of times of small quantity split injections into one continuous fuel spray, as the swirl rotation speed increases, the small quantity split injection interval may be reduced, for example.

The number of splits of the pilot injection and the small quantity split injection interval may be calculated with the aid of a map that defines values of the number of splits and the small quantity split injection interval in association with the injection-time in-cylinder density, the fuel injection pressure, the fuel injection quantity, and the swirl rotation speed, for example. The map has been prepared in advance based on experiments and calculations using models and the like.

It is preferable that the number of splits and the small quantity split injection interval are calculated so that combustible mixture regions in the fuel sprays formed by the first-time small quantity split injection from among the plurality of times of small quantity split injections are connected with one another by the combustible mixture regions in the fuel sprays formed by the subsequent small quantity split injections from among the plurality of times of small quantity split injections. The combustible mixture region is intended to mean a region within the fuel spray in which the fuel air ratio is suitable for ignition and combustion, as shown in FIG. 4a. In the fuel spray, the concentration of the fuel increases toward a center thereof.

Returning back to FIG. 3, when the calculation of the number of splits and the small quantity split injection interval has been completed in the process of Step S12, timings (small quantity split injection timings) of respective small quantity split injections during one combustion cycle are determined. In Step S14, based on the small quantity split injection timings, a timing of generating plasma by the plasma generation processing is calculated. According to the present embodiment, the plasma is generated during a period starting from the first-time small quantity split injection from among the plurality of times of small quantity split injections until the main injection.

In Step S16, the fuel injection control processing including the pilot split injection processing, the plasma generation processing, and the swirl control processing based on the operation condition of the engine 10 are carried out.

If the process of Step S16 is completed, the series of processes is terminated for the current cycle.

Figure 5:
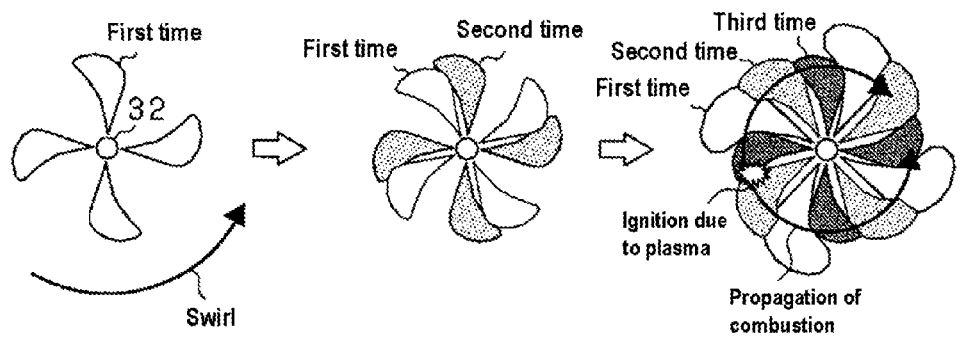
FIG. 5 is a drawing showing an example of the pilot split injection processing according to the embodiment.
Figure 5:
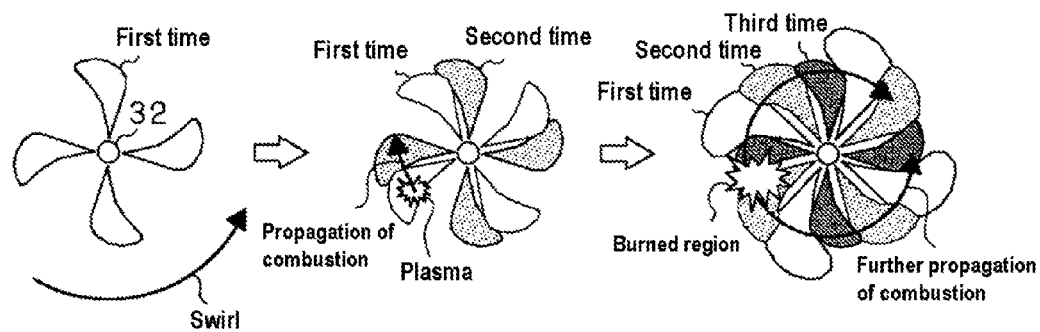
Figure 5:
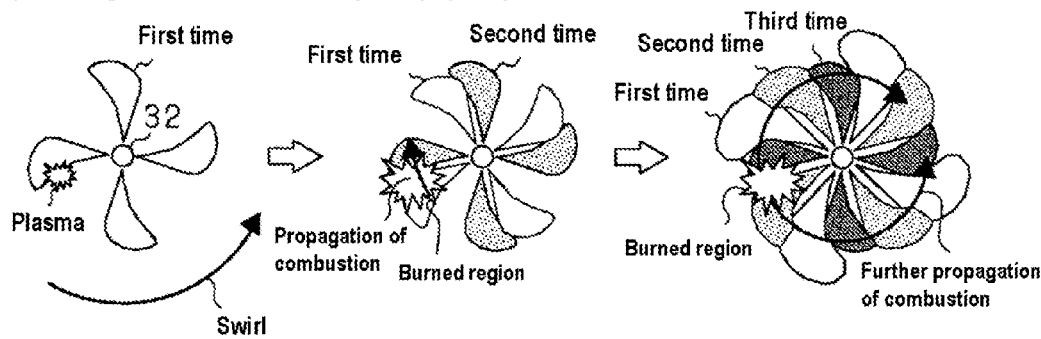

FIG. 5 shows one example of setting the timing of plasma generation during the pilot split injection processing according to the present embodiment. In FIG. 5, the number of splits of the pilot injection is assumed to be three.

First, a description will be given of a case in which the timing of plasma generation is set at a time of the last (third) small quantity split injection with reference to FIG. 5A.

In the example shown in FIG. 5A, under a condition in which the swirl is created in the combustion chamber 22, subsequent to the first-time small quantity split injection, the second-time small quantity split injection is performed so that the fuel sprays respectively formed by the first-time and second-time small quantity split injections overlap with each other for each injection hole 32a. Subsequently, the third-time small quantity split injection is performed so that the fuel sprays respectively formed by the second-time and third-time small quantity split injections overlap with each other for each injection hole 32a, thereby connecting the fuel sprays respectively formed by the three times of small quantity split injections into one continuous fuel spray.

Under the situation described above, immediately after the third-time small quantity split injection, the plasma is generated so that a part of the fuel sprays starts to combust. Subsequently, the combustion is propagated toward the whole continuous fuel spray.

With reference to FIG. 5B, a description will be given of a case in which the timing of plasma generation is set at a time of the second small quantity split injection.

In the example shown in FIG. 5B, the plasma is generated immediately after the second-time small quantity split injection. As a result of this, the fuel spray corresponding to the first-time small quantity split injection is ignited, and the combustion is propagated toward the adjacent fuel spray corresponding to the second-time small quantity split injection. Subsequently, the third-time small quantity split injection is performed, the fuel sprays formed by the three times of small quantity split injections are connected into one continuous fuel spray, and the combustion propagates from a region (a burned region) in which the combustion has already started.

With reference to FIG. 5C, a description will be given of a case in which the timing of plasma generation is set at a time of the first-time small quantity split injection.

In the example shown in FIG. 5C, the plasma is generated immediately after the first-time small quantity split injection is performed, thereby igniting the fuel spray corresponding to the first-time small quantity split injection. Subsequently, the fuel spray formed by the second-time small quantity split injection connects with the fuel spray corresponding to the first-time small quantity split injection, thereby propagating the combustion from the burned region. Subsequently, the third-time small quantity split injection is performed, the fuel sprays formed by the three times of small quantity split injections are connected into one continuous fuel spray, and the combustion further propagates.

Figure 6:
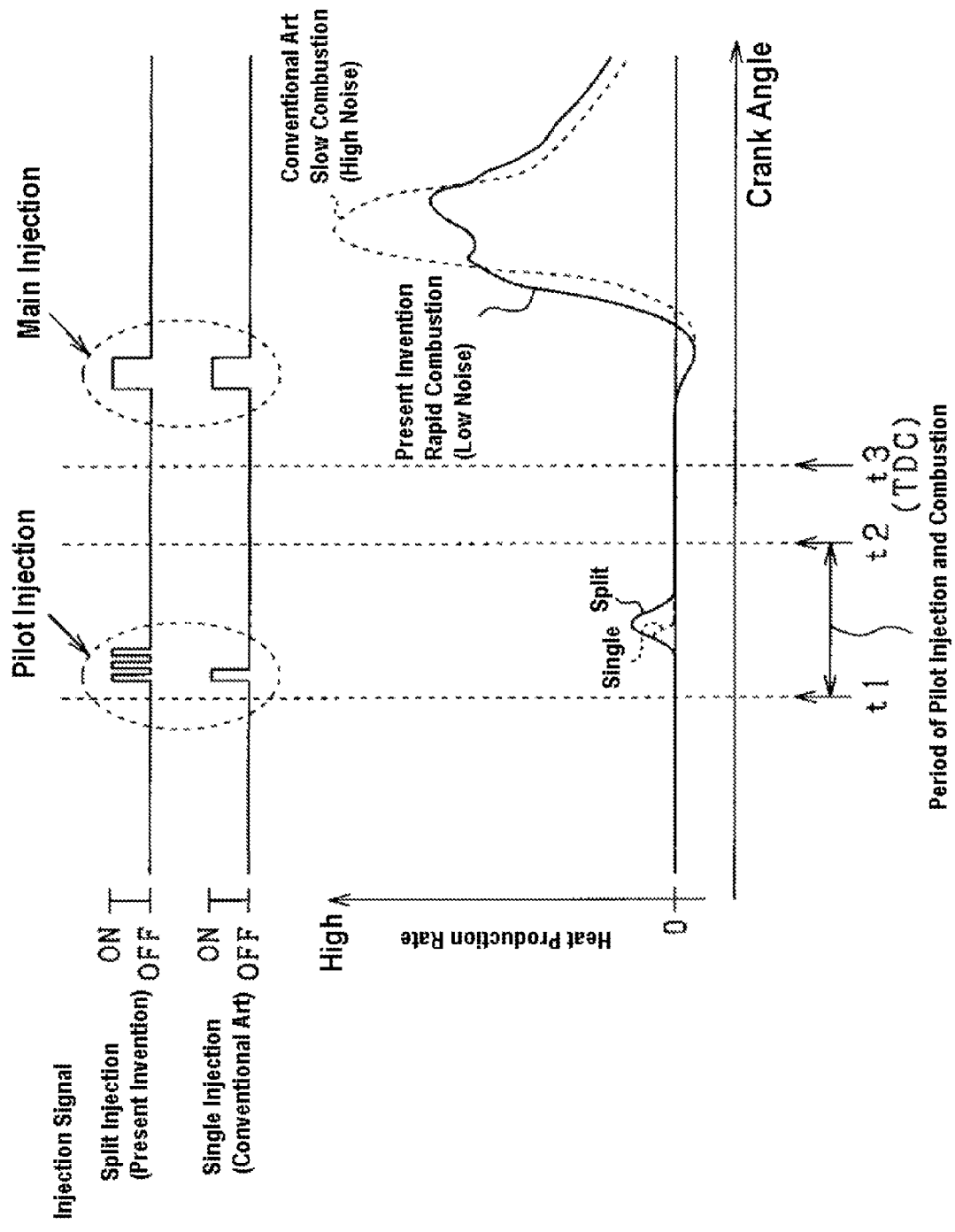
FIG. 6 is a time chart illustrating an effect of the pilot split injection processing according to the embodiment.

FIG. 6 shows an effect of the pilot split injection processing. More particularly, FIG. 6a shows a transition of injection instructions transmitted to the fuel injection valve 32, and FIG. 6b shows a transition of heat production rates. In FIG. 6b, the heat production rate is intended to mean a heat quantity per unit time produced by the combustion of the fuel in the combustion chamber 22.

Figure 7:
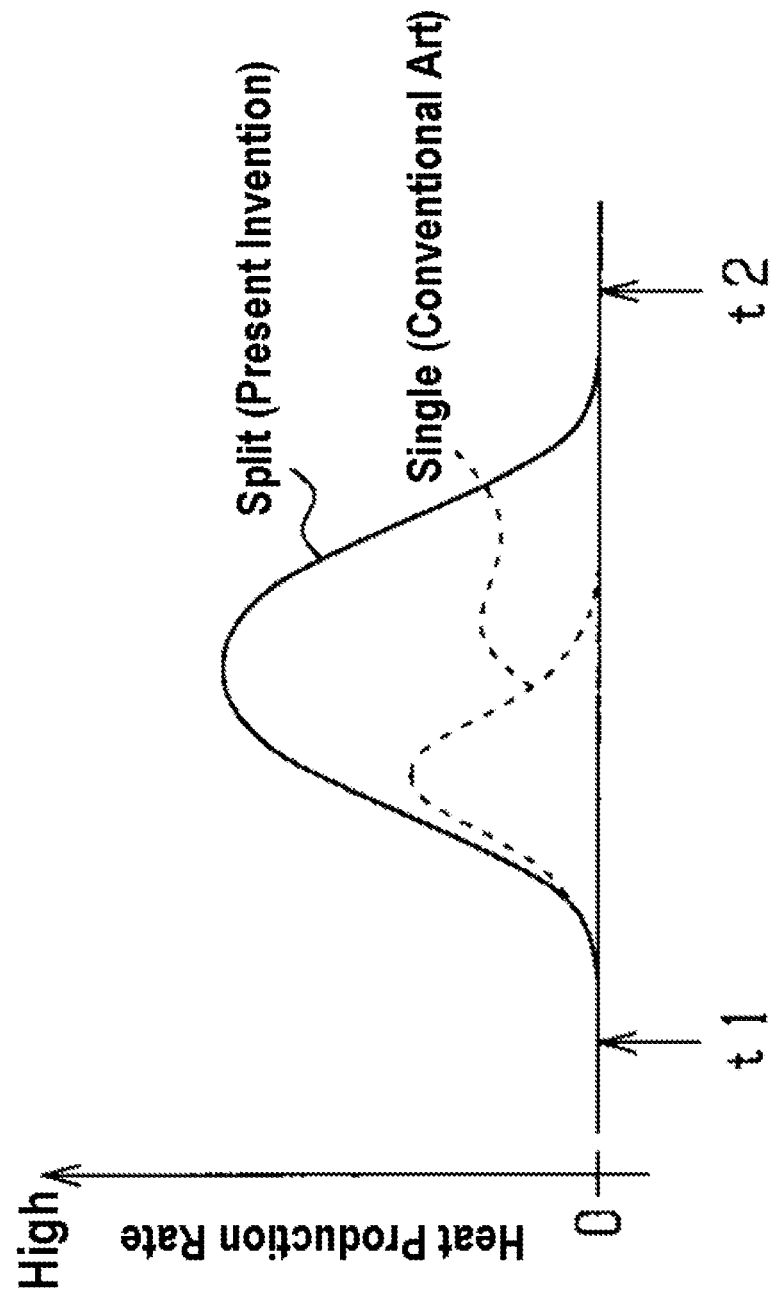
FIG. 7 is a partial enlarged view of FIG. 6.

As shown in FIG. 6, in a case in which the pilot split injection processing is carried out between the times t1 and t2, it is possible to uniformly combust the fuel sprays formed by the pilot injection. As a result of this, the heat production rate increases, and the combustion chamber 22 increases in temperature (see FIG. 7). After the time t3 corresponding to the compression top dead center, the fuel supplied by the main injection to the combustion chamber 22 is combusted. Here, since the combustion chamber 22 has been increased in temperature by the pilot split injection processing, the combustion is slowed down, and the combustion noise is reduced.

On the other hand, with a conventional technology that does not carry out the pilot split injection processing, the fuel spray formed by the pilot injection cannot be properly combusted and the combustion chamber 22 cannot be properly increased in temperature. As a result of this, the subsequent main injection causes a rapid combustion, thereby greatly increasing the combustion noise.

As described above, according to the present embodiment, by carrying out the pilot split injection processing, it is possible to appropriately suppress degradation of combustion condition.

According to the present embodiment described above, it is possible to have following effects.

(1) Based on the injection-time in-cylinder density, the fuel injection pressure of the fuel injection valve 32, the fuel injection quantity, and the swirl rotation speed, the small quantity split injection timings are calculated so that fuel sprays formed by the first-time small quantity split injection from among the plurality of times of small quantity split injections are connected with one another by the fuel sprays formed by the subsequent small quantity split injections from among the plurality of times of small quantity split injections. Then, the pilot split injection processing is carried out based on the calculated small quantity split injection timings. As a result of this, it is possible to improve the combustion condition of the fuel sprays formed by the pilot injection, and therefore appropriately suppress degradation of combustion condition of the engine 10. Accordingly, it is possible to appropriately prevent the combustion noise from increasing.

Furthermore, according to the pilot split injection processing, it is possible to suppress degradation of combustion condition of the engine 10 regardless of the number and locations of the dischargers 38.

(2) The plasma is generated by means of the discharger 38 during a period starting from the first-time small quantity split injection from among the plurality of times of small quantity split injections until the main injection. As a result of this, it is possible to appropriately promote ignition of the fuel sprays formed by the pilot injection.

OTHER EMBODIMENTS

The embodiment described above may be modified and implemented as follows.

A method for promoting ignition of the fuel sprays formed by the pilot injection is not limited to the example of the embodiment described above. For example, there may be provided an emission unit that emits an electromagnetic wave to the combustion chamber 22, and the plasma may be generated by emitting the electromagnetic wave from the emission unit to the combustion chamber 22, thereby promoting ignition of the fuel sprays. More particularly, as the emission unit, for example, an electromagnetic wave emission device including an emission source (an antenna) of the electromagnetic wave protruding toward the combustion chamber 22, and a discharger having a function of electromagnetic wave emission may be employed. Here, the plasma tends to be generated more easily at a location closer to the emission source in the combustion chamber 22.

A discharge may be caused between the electrodes of the discharger 38 within an emission region of the electromagnetic wave. Since the discharge described above serves as a trigger to promote the plasma generation, it can be expected to further promote ignition of the fuel sprays.

Furthermore, a method for promoting ignition of the fuel sprays by supplying electric energy is not limited to the method in which the plasma is generated. For example, there may be provided a heating unit that electrically produces heat in the combustion chamber 22, and the heating unit may produce heat, thereby promoting ignition of the fuel sprays. As the heating unit, for example, an electric heater such as a glow plug that electrically produces heat may be employed.

A method of the swirl control processing is not limited to the example of the embodiment described above. For example, the processing may be such that a target swirl rotation speed is calculated using a map that defines values of the target swirl rotation speed associated with the injection-time in-cylinder density, the fuel injection pressure of the fuel injection valve 32, and the fuel injection quantity, thereby electrically operating the airflow control valve 26 to control an estimated value of the swirl rotation speed to be the target swirl rotation speed. Here, the target swirl rotation speed is a value configured for a purpose of connecting the plurality of fuel sprays formed by the plurality of times of small quantity split injections into one continuous fuel spray, and should be defined in advance through experiments and the like, along with the number of splits of the pilot injection and the small quantity split injection interval.

According to the embodiment described above, the method has been employed of adjusting the small quantity split injection timings for a purpose of connecting the plurality of fuel sprays formed by the plurality of times of small quantity split injections into one continuous fuel spray. However, the present invention is not limited to this. For example, a method of adjusting the swirl rotation speed alone may be employed. For example, in a case in which a control logic has already been provided as reference for calculating the number of times of small quantity split injections preceding the main injection and a time interval between two small quantity split injections in accordance with operation conditions (such as the accelerator operation amount and the engine rotation speed) of the engine 10, the method described above is effective for connecting the plurality of fuel sprays formed by the plurality of times of small quantity split injections into one continuous fuel spray since the control logic can be applied.

More particularly, for example, in a case in which it is expected that adjacent fuel sprays from among the fuel sprays formed by the plurality of times of small quantity split injections from the plurality of injection holes would not be connected with each other based on the operation condition of the engine 10, the swirl rotation speed may be controlled to be slightly reduced. In this manner, it is conceived to be possible to reduce the distance between adjacent fuel sprays, and thus to connect the fuel sprays with one another.

As a calculation method of the number of splits of the pilot injection and the small quantity split injection interval based on the injection-time in-cylinder density, the fuel injection pressure of the fuel injection valve 32, and the like, the present invention is not limited to the example of the embodiment described above. For example, as long as it is possible to connect the plurality of fuel sprays formed by the plurality of times of small quantity split injections into one continuous fuel spray, the number of splits of the pilot injection may be set to be decreased, and the small quantity split injection interval may be set to be increased as the injection-time in-cylinder density is increased, the fuel injection pressure is reduced, or the fuel injection quantity is decreased. The setting method described above may be implemented by determining in advance the number of splits of the pilot injection and the small quantity split injection interval associated with the injection-time in-cylinder density, the fuel injection pressure, and the like byway of experiments and calculations using models including the injection-time in-cylinder density, the fuel injection pressure, and the like as parameters. Furthermore, for example, as long as it is possible to connect the plurality of fuel sprays into one continuous fuel spray, a control logic may be employed in which one of the number of splits of the pilot injection and the small quantity split injection interval is fixed, and the other is adjustable.

According to the embodiment described above, it has been described that one fuel injection valve is provided for each cylinder. However, the present invention is not limited to this. For example, a plurality (two) of fuel injection valves may be provided for each cylinder. In this case, as long as the fuel sprays formed by the respective pilot injections from the fuel injection valves are separated from one another in the combustion chamber, it is conceived that the pilot split injection processing can be applied effectively.

According to the embodiment described above, the fuel quantity assigned to the pilot injection has been equally split and allocated to the plurality of times of small quantity split injections. However, the present invention is not limited to this. For example, the fuel quantities respectively allocated to the plurality of times of small quantity split injections may be made different from one another.

According to the embodiment described above, the in-cylinder density has been calculated based on the intake quantity and the like. However, the present invention is not limited to this. For example, the combustion chamber 22 may be provided with a sensor that directly detects an in-cylinder pressure, and the in-cylinder density may be calculated based on the in-cylinder pressure detected by the sensor.

According to the embodiment described above, the rail pressure has been employed as the fuel injection pressure of the fuel injection valve. However, the present invention is not limited to this. For example, the fuel injection valve may be provided with a sensor that detects the fuel injection pressure, and a detected value of the sensor may be employed as the fuel injection pressure.

According to the embodiment described above, the plasma may be generated between the electrodes of the discharger 38 prior to the pilot injection so that the active species such as OH radicals come into a diffusion state in the combustion chamber 22 owing to the swirl at a start time of the pilot injection. In this case, even if some regions may exist in which the fuel concentration is lean in the combustion chamber 22, it is possible to propagate the combustion from a burned region. A timing of plasma generation prior to the pilot injection is determined based on the swirl rotation speed, and the timing becomes earlier as the swirl rotation speed is lower. The plasma may be generated a plurality of times prior to the pilot injection so that the active species increase in the combustion chamber 22 at the start time of the pilot injection.

In the embodiment described above, the electric energy per unit time to be supplied to the electrodes of the discharger 38 for plasma generation may be increased as the swirl rotation speed is higher. In this case, it is possible to prevent the plasma from being blown out by the swirl.

In the embodiment described above, the plasma may be generated a plurality of times at the time of the pilot injection. In this case, it is possible to ensure the combustion of the fuel at the pilot injection. The electric energy per unit time to be supplied to the electrodes of the discharger 38 may be varied in accordance with the timing of plasma generation. For example, as fuel concentration becomes leaner in between the electrodes of the discharger 38 at the timing of plasma generation, the electric energy may be increased.

EXPLANATION OF REFERENCE NUMERALS

10 Engine
22 Combustion Chamber
26 Airflow Control Valve
30 Common Rail
32 Fuel Injection Valve
32a Injection Hole
38 Discharger
56 ECU (one embodiment of a control device for an internal combustion engine)

What is claimed is:

1. A control device for an internal combustion engine that causes a fuel injection valve formed with a plurality of injection holes to perform a main injection and a plurality of times of small quantity injections preceding the main injection for one cylinder of a compression ignition type internal combustion engine during one combustion cycle of the internal combustion engine, the internal combustion engine including an ignition promotion unit that has a function of promoting ignition of fuel sprays formed by the small quantity injections by supplying the fuel sprays with electric energy, wherein
   the control device comprises a combustion control unit that carries out processing of causing the fuel injection valve to perform the plurality of times of small quantity injections so that fuel sprays formed by the first-time small quantity injection from among the plurality of times of small quantity injections are connected with one another by the fuel sprays formed by the subsequent small quantity injections from among the plurality of times of small quantity injections.

2. The control device for the internal combustion engine according to claim 1, wherein
   the combustion control unit carries out processing of setting the number of times of the small quantity injections and a time interval between the small quantity injections based on at least one of a gas density in the combustion chamber of the internal combustion engine, a fuel injection pressure of the fuel injection valve, a fuel injection quantity allocated to the small quantity injection, and a rotation speed of a swirl created in the combustion chamber.

3. The control device for the internal combustion engine according to claim 1, wherein
   the combustion control unit carries out processing of adjusting a rotation speed of a swirl created in the combustion chamber of the internal combustion engine so that fuel sprays formed by the first-time small quantity injection from among the plurality of times of small quantity injections are connected with one another by the fuel sprays formed by the subsequent small quantity injections from among the plurality of times of small quantity injections.

4. The control device for the internal combustion engine according to claim 1, wherein
   the ignition promotion unit is constituted by a plasma generation unit that generates plasma in the combustion chamber of the internal combustion engine.

5. The control device for the internal combustion engine according to claim 4, wherein
   the plasma generation unit includes electrodes protruding toward the combustion chamber and is adapted to generate plasma in the combustion chamber by way of a discharge between the electrodes.

6. The control device for the internal combustion engine according to claim 4, wherein
   the plasma generation unit generates plasma in the combustion chamber by emitting an electromagnetic wave toward the combustion chamber.

7. The control device for the internal combustion engine according to claim 4, wherein
   the plasma generation unit is caused to generate plasma prior to the plurality of times of small quantity injections so that active species comes into a diffusion state owing to a swirl created in the combustion chamber at a start time of the plurality of times of small quantity injections.

8. The control device for the internal combustion engine according to claim 4, wherein
   the plasma generation unit is caused to generate plasma a plurality of times during a period while the fuel sprays of the plurality of times of small quantity injections are present.

9. The control device for the internal combustion engine according to claim 1, wherein
   the control device further comprises a unit for supplying the fuel sprays with electric energy by means of the ignition promotion unit during a period starting from the time of the first-time small quantity injection from among the plurality of times of small quantity injections until the time of the main injection.

10. The control device for the internal combustion engine according to claim 1, wherein
    the plurality of the injection holes are formed on a plane perpendicular to a central axis of the fuel injection valve and spaced apart from one another at intervals on a periphery of the fuel injection valve.

11. A control device for an internal combustion engine that causes a fuel injection valve formed with a plurality of injection holes to perform a main injection and a plurality of times of small quantity injections preceding the main injection for one cylinder of the internal combustion engine during one combustion cycle of a compression ignition type internal combustion engine, the internal combustion engine including an ignition promotion unit that has a function of promoting ignition of fuel sprays formed by the small quantity injections by supplying the fuel sprays with electric energy, wherein
    the control device comprises a combustion control unit that carries out processing of adjusting a rotation speed of a swirl created in a combustion chamber of the internal combustion engine so that fuel sprays formed by the first-time small quantity injection from among the plurality of times of small quantity injections are connected with one another by the fuel sprays formed by the subsequent small quantity injections from among the plurality of times of small quantity injections.

* * * * *